B. H. Bradley.
Nut Machine.
No. 105,033.          Patented Jul. 5, 1870.
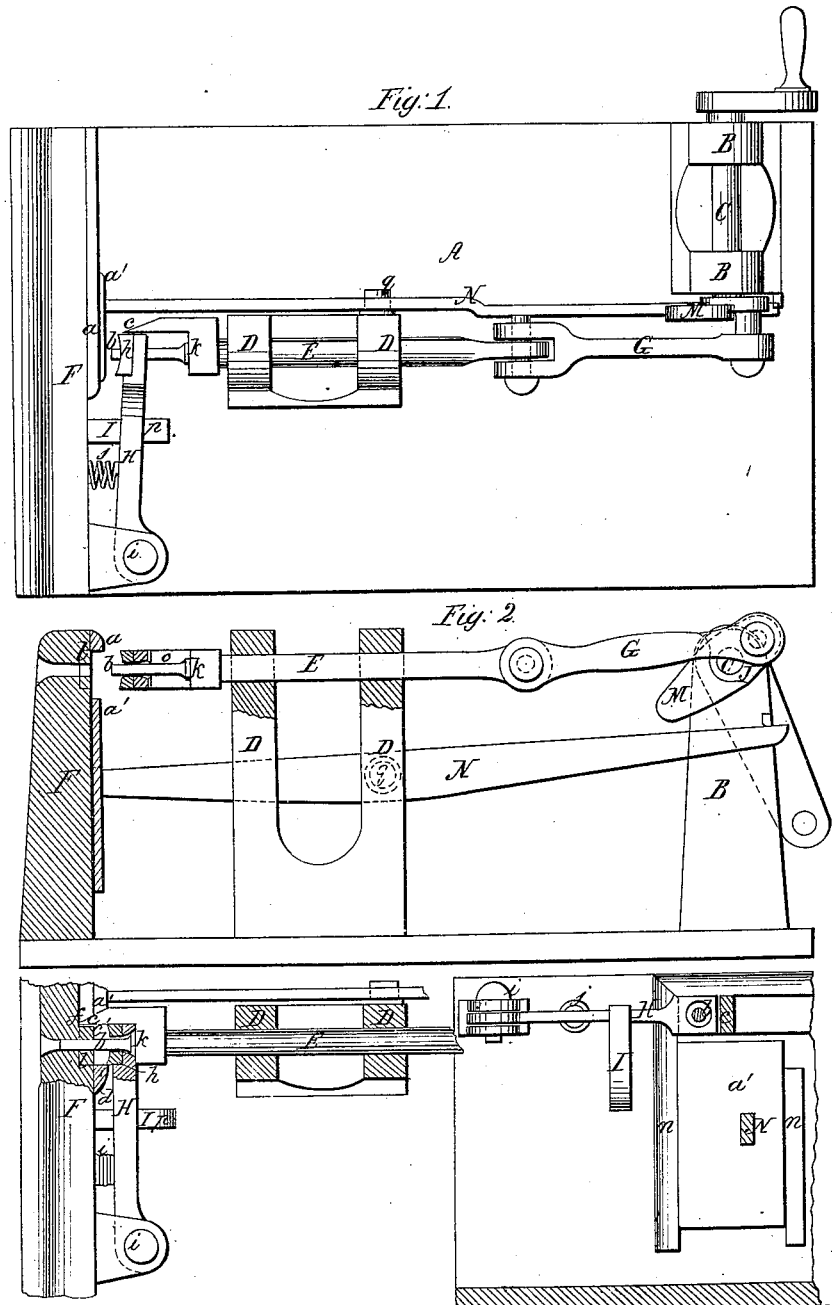
Witnesses:
Fred. Haynes
A. D. Mahew
Inventor,
Benjamin H. Bradley

UNITED STATES PATENT OFFICE.

BENJAMIN H. BRADLEY, OF NEW YORK, N. Y.

IMPROVED MACHINE FOR MAKING NUTS.

Specification forming part of Letters Patent No. 105,033, dated July 5, 1870.

*To all whom it may concern:*

Be it known that I, BENJAMIN H. BRADLEY, of the city, county, and State of New York, have invented a new and Improved Machine for Forging Nuts; and I do hereby declare that the following is a full, clear, and exact description of the same, reference being had to the accompanying drawings, forming part of this specification, in which—

Figure 1 is a plan view of a machine with my improvement. Fig. 2 is a vertical section of the same. Fig. 3 is a horizontal section of the principal working parts of the same.

Similar letters of reference indicate corresponding parts in the several figures.

This invention consists in a novel arrangement of cutters, a punch, and dies for punching the holes in and cutting off the nut-blanks from a heated bar of iron and shaping them into nuts, whereby I obtain a very simple machine, of portable dimensions and cheap construction, capable of producing from bar-iron finished nuts at one stroke.

To enable others skilled in the art to make and use my invention, I will proceed to describe it with reference to the drawings.

The machine represented is what may be termed a "horizontal machine," all its working parts moving horizontally.

A is a bed-plate, having arranged upon it two standards, B B, containing the bearings for the horizontal rotary driving-shaft C of the machine, two standards, D D, containing the guides for the horizontal plunger E, and a standard, F, to which are attached two horizontal guides, $a\ a'$, the upper one, $a$, of which is stationary, and the lower one, $a'$, movable, as hereinafter described. Between and by means of these guides $a\ a'$ the bar from which the nuts are made is directed and guided while being fed into the machine, and the said bar is centered laterally while being punched and while the nut-blanks are being cut off. The plunger E carries at the end next the standard F a punch, $b$, for punching the holes in the nut-blanks, and a cutter, $c$, for cutting them off from the bar, the punch projecting sufficiently beyond the edge of the cutter to enable it to punch the hole in the bar before the action of the cutter, produced by the continued movement of the plunger, commences. The plunger has imparted to it a reciprocating rectilinear longitudinal movement through a connecting-rod, G, connecting it with a crank, J, on the shaft C. The shaft may have its rotary motion produced by means of a crank, or by pulleys or gearing.

Into the face of that portion of the standard F which is between the guides $a\ a'$ there is inserted a die, $l$, in which the punch $b$ works to punch the bar to make the nuts, and at the inner end of the space between the said guides $a\ a'$ is a projection, $d$, on the standard F, which constitutes a stop to stop the end of the bar as it is fed into the machine in proper position for punching the hole and cutting off the nut-blank. The edge $c'$ of the die $l$ constitutes a stationary cutter, in conjunction with which the cutter $c$ operates to cut off the nut-blanks from the bar.

$h$ is a cup-shaped die for rounding off the edges and corners of the face of the nut. This die is arranged opposite to the punch, and has a central hole for the passage of the punch through it. It is carried by a horizontally-vibrating arm, H, which is pivoted by a pin, $i$, to the standard F, and has applied to it a spring, $j$, which exerts a constant tendency to push it back from the standard and keep the die $h$ clear of the guides $a\ a'$ and projection $d$.

Under the arm H a fixed bracket, I, is attached to the standard F, to support the arm H and prevent it from dropping down and letting the die $h$ get out of proper range with the punch, cutter, and guides $a\ a'$. This bracket also has upon it a projection, $p$, which serves as a stop to the arm H.

The movable guide $a'$, before mentioned, is fitted to slide in vertical guides $n\ n$ on the standard F, such movement being to permit the bar from which the nuts are formed to be fed freely into the machine, but to enable the said bar to be held firmly in place during the punching operation. The movement of the guide $a'$ is effected by a cam, M, on the shaft C, which acts upon the said guide through a lever, N, working upon a fulcrum-pin, $q$, secured in one of the standards D D.

To make nuts in this machine, rotary motion is given to the shaft C, and a reciprocating motion is thereby imparted to the plunger E and its attached punch, and the bar from which the nuts are to be made having been heated to the requisite degree is fed, by hand or otherwise, between the guides $a\ a'$, from that side of the machine which is at the top of Figs. 1 and 3, until its end comes in contact with the stop $d$. The guide $a'$ then comes up and clamps the bar. As the plunger then moves forward toward the standard F, the punch $b$ punches the hole in the bar, and by the further continued forward movement of the plunger the cutter $c$, acting in conjunction with the fixed cutter $c'$, cuts off the blank to form the nut. After the blank has been cut off the further continued forward movement of the plunger brings the shoulder $k$, provided on the plunger in rear of the punch, into contact with the vibrating arm H, and pushes the said arm toward the standard F, and brings the cup-shaped die $h$ into operation on the nut-blank, and squares its sides and rounds off its corners and edges, thus producing the finished nut. As the plunger retires it allows the arm H to be forced back by the spring $j$, and the die $h$ to be thus withdrawn, and as the retirement continues, and after the said die comes back against the stop $p$, the punch is withdrawn through the said die and the nut drops out from the machine, having been released by the descent of the guide $a$. The bar is moved forward up to the stop $d$ before the plunger again advances, and with the advance of the plunger the operation is repeated.

Instead of being arranged to work horizontally, as described, the working parts of the machine may be arranged to work vertically. The die $h$, instead of being carried by a vibrating arm, H, may be carried by a slide having a parallel motion, such slide being operated upon by the plunger E in substantially the same manner as the vibrating arm H.

To adapt the machine to making nuts of different sizes, the guides $a\ a'$, stop $d$, and cutters must be adjustable.

What I claim as my invention, and desire to secure by Letters Patent, is—

The plunger E, punch $b$, and cutter $c$, rigidly connected together, in combination with the guides $a\ a'$, stop $d$, cutter $c'$, and die $h$, all arranged for operation substantially as herein set forth.

BENJAMIN H. BRADLEY.

Witnesses:
FRED. HAYNES,
R. E. RABEAU.